Patented June 6, 1950

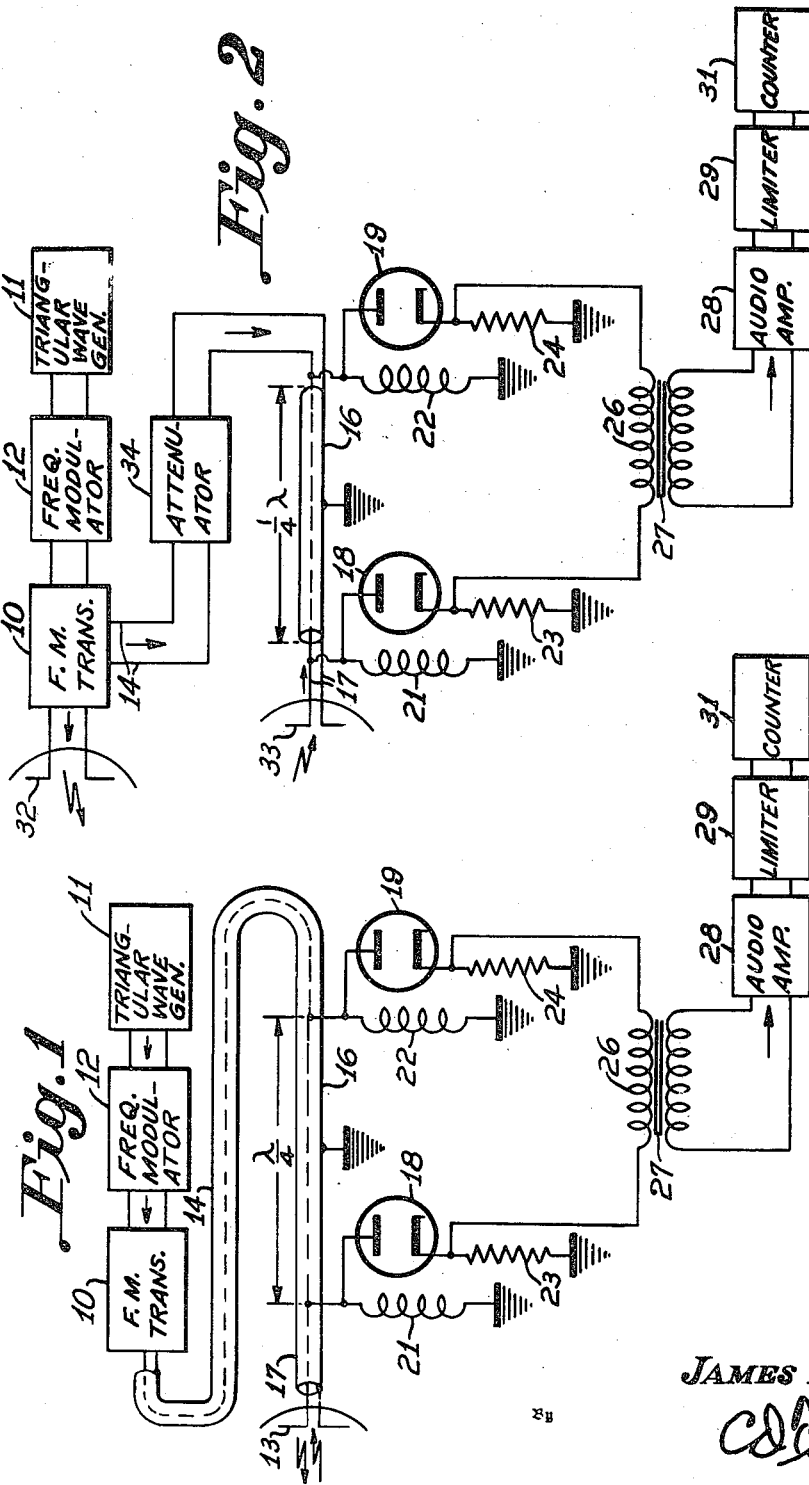

2,510,710

UNITED STATES PATENT OFFICE 2,510,710

BALANCED DETECTOR SYSTEM FOR RADAR APPARATUS

James R. Moore, Washington, D. C., assignor to Radio Corporation of America, a corporation of Delaware Application February 7, 1947, Serial No. 727,174

6 Claims. (Cl. 343—14)

My invention relates to the use of reflected radio waves for obtaining information concerning the wave reflecting object. The invention will be described with particular reference to a frequency modulated radar system.

One of the objects of the invention is to provide an improved method of and means for operating radar apparatus of the continuously transmitting type with a single antenna used for both transmitting and receiving.

A further object of the invention is to provide an improved method of and means for beating a reflected signal with signal taken directly from the transmitter that transmitted said signal to the reflecting object.

A still further object of the invention is to provide an improved balanced detector for a radar system of the frequency modulated type.

According to a preferred embodiment of the invention, signal from the radio transmitter and signal received from the reflecting object are applied to opposite ends of a line a quarter wave length long. The two signals are each shifted 90 degrees in phase by the time they travel the length of the quarter-wave line so there is a 180 degree phase difference between the transmitter-receiver signal relation at opposite ends of the line. Rectifiers at each end of the line provide beat frequency outputs and the beat frequency outputs of the two rectifiers are 180 degrees out of phase. The beat frequency outputs are then supplied to a push-pull circuit and only signals having the 180 degree relation appear in the circuit output.

The invention will be better understood from the following description taken in connection with the accompanying drawing in which Figure 1 is a block and circuit diagram showing an embodiment of the invention where a single antenna is employed for both transmitting and receiving, and Figure 2 is a block and circuit diagram showing the invention as applied to a radar system where separate antennas are employed for transmitting and receiving.

In the several figures similar parts are indicated by similar reference characters.

In Fig. 1 the invention is shown applied to a frequency modulated radar system comprising a radio transmitter 10 that is cyclically frequency modulated by a modulating wave that may be triangular in wave shape, for example. The triangular wave is applied from a triangular wave generator 11 to a frequency modulator 12 that frequency modulates the transmitter 10.

An antenna 13, which may be a dipole in a parabolic reflector, is provided for use both as a transmitter antenna and as a receiver antenna. The connection from the transmitter 10 to the antenna 13 is through a length of coaxial cable 14, through a coaxial line section 16 that is a quarter wave length long, and through a coaxial section 17.

The signal reflected from the distance object is picked up by the antenna 13 and passes through the cable 17 and through the quarter-wave line 16, the received signal being applied to a diode mixer 18 from the antenna end of the section 16 and to a diode mixer 19 from the other end of the section 16.

The quarter-wave section 16 is impedance matched at both ends so that no standing waves are developed. The connections from the ends of the quarter-wave section 16 through the diodes 18 and 19 to ground are of sufficiently high impedance to avoid disturbing the impedance match. The inductance coils 21 and 22 are high impedance choke coils that provide direct-current return paths for the diodes 18 and 19, respectively. The diodes 18 and 19 are provided with cathode resistors 23 and 24, respectively, from which the beat frequency output signal is taken.

The received signal at the end of the section 16 feeding the diode 19 has been shifted 90 degrees with respect to the received signal at the antenna end of the section 16. Likewise, the transmitted signal at the antenna end of section 16 has been shifted 90 degrees with respect to the transmitted signal at the other end of section 16. Therefore, at the opposite ends of the section 16 there is a 180 degree phase difference between the transmitter-receiver signal relation. Consequently, the beat frequency outputs of the diodes 18 and 19 resulting from the mixing of the transmitted and received signals are 180 degrees out of phase.

The outputs of rectifiers 18 and 19 are supplied to opposite ends of the primary 26 of a push-pull transformer 27 so that signal is supplied to an audio amplifier 28 if the said outputs are 180 degrees out of phase. Thus only the desired beat frequency signal is supplied to the amplifier 28 and any amplitude modulation that may be on the strong transmitted signal is not supplied to the amplifier 28. The output of the amplifier 28 may be supplied through an amplitude limiter 29 to a frequency counter 31 in the usual way.

Fig. 2 shows the invention applied to a frequency modulated radar system having separate antennas, 32 and 33 for transmission and reception, respectively. In this case the signal applied from the transmitter 10 to the line section 16 is a weak signal that has only sufficient amplitude for beating with the received signal to produce the desired beat frequency output. The beating signal from the transmitter 10 may be suitably reduced in amplitude by an attenuator 34 or, instead, the line or cable section 14 may be coupled to the transmitter with very loose coupling.

Since the beating signal from the transmitter 10 is a comparatively weak signal, any undesired amplitude modulation thereon will result in only a small amplitude signal after demodulation as compared with a corresponding signal resulting from demodulation of the full strength transmitted signal. For this reason the problem of eliminating amplitude modulation signal is not as serious where two antennas are used as where a single antenna is used. Nevertheless, it has been the preferred practice to employ a balanced mixer in the two-antenna systems for the purpose of balancing out any amplitude modulation component. As shown in Fig. 2, the circuit of the present invention may be employed as such a balanced mixer. Its operation is the same as previously described.

I claim as my invention:

1. In combination, a radio transmitter, means for radiating signal from said transmitter toward a reflecting object, means for receiving said signal after reflection from said object, a transmission line section having a length equal to one-quarter the wave length at which said transmitter operates, means for applying signal direct from the transmitter to one end of said quarter-wave line, means for applying said received signal to the other end of said quarter-wave line, a pair of rectifiers, means for applying signal from one end of said quarter-wave line to one of said rectifiers, means for applying signal from the other end of said quarter-wave line to the other of said rectifiers whereby the beat frequency outputs of said rectifiers are 180 degrees out of phase, an output circuit, and means for supplying said rectifier outputs to said output circuit in phase opposition so as to pass only signals that are substantially 180 degrees out of phase at said rectifier output circuits.

2. The invention according to claim 1 wherein means is provided for cyclically frequency modulating said radio transmitter, said wave length at which the transmitter operates being that of the carrier wave or mean frequency signal.

3. In a radio system utilizing radio waves reflected from a distant object, a radio transmitter, an antenna, a transmission line having a length equal to one-quarter the wave length at which the transmitter operates, means for applying reflected signal from said antenna to one end of said line, means for applying signal direct from said transmitter to the other end of said line, a rectifier connected to one end of said line whereby it supplies a beat frequency output, a rectifier connected to the other end of said line whereby it supplies a beat frequency output that is 180 degrees out of phase with said first beat frequency output, an output circuit, and means for supplying said two beat frequency outputs in phase opposition to said output circuit whereby only signals having a 180 degree phase relation are passed by said output circuit.

4. In combination, a single antenna for transmission and reception, a radio transmitter, means including said antenna for receiving signal after reflection from a reflecting object, a transmission line section having a length equal to one-quarter the wave length at which said transmitter operates, means for supplying the transmitter signal to said antenna through said quarter-wave line whereby said transmitter signal is applied to one end of said line and said received signal is applied to the other end of said line, a pair of rectifiers, means for applying signal from one end of said quarter-wave line to one of said rectifiers, means for applying signal from the other end of said quarter-wave line to the other of said rectifiers whereby the beat frequency outputs of said rectifiers are 180 degrees out of phase, an output circuit, and means for supplying said rectifier outputs to said output circuit in phase opposition so as to pass only signals that are substantially 180 degrees out of phase at said rectifier output circuits.

5. In a frequency modulated radar system, a single antenna for transmission and reception, a radio transmitter operating at a mean carrier frequency, means for cyclically frequency modulating said transmitter, means including said antenna for receiving signal after reflection from a reflecting object, a transmission line section having a length equal to one-quarter the wave length at which said transmitter operates, means for supplying the transmitter signal to said antenna through said quarter-wave line whereby said transmitter signal is applied to one end of said line and said received signal is applied to the other end of said line, a pair of rectifiers, means for applying signal from one end of said quarter-wave line to one of said rectifiers, means for applying signal from the other end of said quarter-wave line to the other of said rectifiers whereby the beat frequency outputs of said rectifiers are 180 degrees out of phase, an output circuit, and means for supplying said rectifier outputs to said output circuit in phase opposition so as to pass only signals that are substantially 180 degrees out of phase at said rectifier output circuits.

6. In combination, a pair of antennas for transmission and reception, respectively, a radio transmitter connected to the transmitting antenna, means including the receiving antenna for receiving signal after reflection from a reflecting object, a transmission line section having a length equal to one-quarter the wave length at which said transmitter operates, means for supplying a small amplitude signal direct from the transmitter to one end of said quarter-wave line, means connecting the receiving antenna to the other end of said line, a pair of rectifiers, means for applying signal from one end of said quarter-wave line to one of said rectifiers, means for applying signal from the other end of said quarter-wave line to the other of said rectifiers whereby the beat frequency outputs of said rectifiers are 180 degrees out of phase, an output circuit, and means for supplying said rectifier outputs to said output circuit in phase opposition so as to pass only signals that are substantially 180 degrees out of phase at said rectifier output circuits.

JAMES R. MOORE.

REFERENCES CITED

The following references are of record in the file of this patent:

UNITED STATES PATENTS

| Number | Name | Date |
|---|---|---|
| 2,402,421 | Lindenblad | June 18, 1946 |
| 2,419,046 | Wolff | Apr. 15, 1947 |